US011014541B2

(12) United States Patent
Conaway et al.

(10) Patent No.: US 11,014,541 B2
(45) Date of Patent: May 25, 2021

(54) SEMI-TRAILER LANDING GEAR ACTUATOR

(71) Applicant: AIRman Products, LLC, Brighton, MI (US)

(72) Inventors: Richard Lee Conaway, Grand Haven, MI (US); Richard Allen Conaway, Nunica, MI (US)

(73) Assignee: AIRman Products, LLC, Brighton, MI (US)

( * ) Notice: Subject to any disclaimer, the term of this patent is extended or adjusted under 35 U.S.C. 154(b) by 121 days.

(21) Appl. No.: 16/292,950

(22) Filed: Mar. 5, 2019

(65) Prior Publication Data

US 2019/0308593 A1    Oct. 10, 2019

Related U.S. Application Data

(60) Provisional application No. 62/761,871, filed on Apr. 9, 2018.

(51) Int. Cl.
*B60S 9/12* (2006.01)
*B60S 9/04* (2006.01)

(52) U.S. Cl.
CPC . *B60S 9/12* (2013.01); *B60S 9/04* (2013.01); *B60Y 2200/148* (2013.01)

(58) Field of Classification Search
CPC .................. B60S 9/02; B60S 9/10; B60S 9/12
See application file for complete search history.

(56) References Cited

U.S. PATENT DOCUMENTS

| | | | | |
|---|---|---|---|---|
| 4,281,852 A * | 8/1981 | Konkle | ...................... | B60S 9/12 280/766.1 |
| 4,400,986 A * | 8/1983 | Swanson | .................. | B60S 9/08 280/766.1 |
| 4,402,526 A * | 9/1983 | Huetsch | ..................... | B60S 9/08 280/766.1 |
| 5,050,845 A * | 9/1991 | Aline | ........................ | B60S 9/12 254/419 |
| 5,451,076 A * | 9/1995 | Burkhead | ................. | B60S 9/04 280/475 |
| 5,911,437 A * | 6/1999 | Lawrence | ................. | B60S 9/10 254/419 |
| 6,099,016 A * | 8/2000 | Peveler | ..................... | B60S 9/08 254/419 |
| 6,224,103 B1 * | 5/2001 | Hatcher | .................... | B60S 9/08 254/419 |
| 6,260,882 B1 * | 7/2001 | Kingsbury | ................ | B60S 9/08 254/219 |
| 6,598,886 B2 * | 7/2003 | Baird | ........................ | B60P 1/56 254/419 |

(Continued)

*Primary Examiner* — Jeffrey J Restifo
(74) *Attorney, Agent, or Firm* — Bond, Schoeneck & King, PLLC

(57) ABSTRACT

A semi-trailer landing gear assembly can include a set of legs actuable to raise and lower a semi-trailer. Each leg can include a foot abutting the ground and a support abutting the semi-trailer. A rotatable shaft couples to the set of legs where rotation of the rotatable shaft raises and lowers the legs. A crank can operably couple to the rotatable shaft to rotate the rotatable shaft. At least two air drivers operably couple to the crank to rotate the crank in an opposing manner such that at least one air driver is always offset from the direction of rotation to provide continuous torque.

10 Claims, 14 Drawing Sheets

(56) References Cited

U.S. PATENT DOCUMENTS

| | | | | |
|---|---|---|---|---|
| 6,896,289 B2* | 5/2005 | Gross | ............ | B60S 9/08 |
| | | | | 254/419 |
| 6,926,305 B2* | 8/2005 | Daniel | ............ | B60S 9/08 |
| | | | | 254/419 |
| 7,036,847 B2* | 5/2006 | Alguera | ............ | B60S 9/08 |
| | | | | 280/763.1 |
| 7,044,445 B1* | 5/2006 | Crawford | ............ | B60S 9/08 |
| | | | | 254/425 |
| 7,163,207 B2* | 1/2007 | Baird | ............ | B60P 1/56 |
| | | | | 254/419 |
| 7,290,799 B2* | 11/2007 | Santos | ............ | B60S 9/12 |
| | | | | 254/418 |
| 8,827,309 B1* | 9/2014 | Ouellet | ............ | B60S 9/08 |
| | | | | 280/763.1 |
| 8,894,039 B2* | 11/2014 | Conaway | ............ | B60S 9/04 |
| | | | | 254/419 |
| 8,919,738 B2* | 12/2014 | Daniel | ............ | B60S 9/12 |
| | | | | 254/419 |
| 10,315,628 B2* | 6/2019 | Raymond, Sr. | ............ | B60S 9/10 |
| 10,343,654 B2* | 7/2019 | Evans | ............ | B66F 3/08 |
| 10,556,572 B2* | 2/2020 | Sun | ............ | B60S 9/04 |
| 10,688,972 B2* | 6/2020 | Kinder | ............ | B60S 9/10 |

\* cited by examiner

SEMI-TRAILER LANDING GEAR ACTUATOR

CROSS-REFERENCE TO RELATED APPLICATION

This application claims priority to U.S. Provisional Application Ser. No. 62/761,871 filed Apr. 9, 2018, the disclosure of which is incorporated herein in its entirety.

BACKGROUND OF THE INVENTION

The invention relates to mechanisms that drive rotational movement, and more particularly to an improvement in an actuator that is driven by air drivers such as that used in a landing gear of a semi-trailer.

One environment to which the invention may be applicable is found in FIG. 1 where a conventional landing gear 10 for a semi-trailer is shown. The landing gear 10 is used to support a semi-trailer when the semi-trailer is disconnected from a tractor. The landing gear 10 is designed to expand and contract vertically. In expansion, the landing gear 10 lifts the front of a semi-trailer so that it can be disconnected from the tractor, and thereafter supports the front of the semi-trailer when the tractor departs. In contraction, the landing gear 10 lowers the front of the semi-trailer to enable connection to a tractor, and, once connected, to further gain ground clearance so the semi-trailer can be pulled by the tractor free of interference.

The landing gear 10 comprises a pair of spaced legs 12, each having a mounting bracket 14 for securing the landing gear to a frame of a semi-trailer (not shown). Each leg 12 comprises a hollow tube 16 within which is the leg 12 that is geared to extend from and retract into the hollow tube 16. Each leg 12 has a foot pad 18 that supports the landing gear 10 on the ground. A gearbox 20 mounted to one of the legs controls the extension and retraction of both legs by way of a cross drive shaft 22 extending between the legs 12. The gearbox 20 is manually driven by a crank handle 24. It can require substantial torque via the gearbox 20 to raise a loaded semi-trailer, on the order of less than or equal to 100 foot pounds when the trailer is loaded and the foot pad 18 is in contact with the ground.

BRIEF SUMMARY OF THE INVENTION

In one aspect, the disclosure relates to an air driven actuator for raising and lowering a semi-trailer landing gear, the air driven actuator including: at least two air drivers each including a reciprocating shaft moveable between a fully retracted position and a fully extended position; a link moveable about a rotatable axis in a direction of rotation and having a pin spaced from the rotatable axis along a link line to which the reciprocating shafts of the at least two air drivers are attached; and a controller to sequentially pressurize the at least two air drivers urging the reciprocating shafts to apply a force to the link when the reciprocating shafts move from the fully retracted position to the fully extended position; wherein the at least two air drivers are arranged such that at least one of the reciprocating shafts is always at an acute angle behind a line perpendicular to the link line in the direction of rotation when the one of the at least two air drivers having the at least one of the reciprocating shafts is pressurized by the controller.

In another aspect, the disclosure relates to a semi-trailer landing gear assembly including a set of legs actuable to raise and lower the set of legs; a rotatable shaft operably coupled to the set of legs where rotation of the rotatable shaft raises or lowers the set of legs; a rotatable link rotatable about a rotational axis and operably coupled to the rotatable shaft, and having a pin spaced from the rotational axis along a link line; at least two air drivers each including a reciprocating shaft coupled to the pin and moveable between a fully retracted position and a fully extended position; and a controller to sequentially pressurize the at least two air drivers to urge the reciprocating shafts to apply a force to the link; wherein the at least two air drivers are arranged such that at least one of the at least two air drivers is always at an acute angle behind a line perpendicular to the link line in the direction of rotation of the rotatable link when the one of the at least two air drivers is pressurized by the controller.

DESCRIPTION OF EMBODIMENTS OF THE INVENTION

The disclosure herein is described in relation to an actuator assembly for operating a semi-trailer landing gear used to raise and lower semi-trailers from and onto semi-trailer tractors. The actuator assembly provides for increased torque, which provides for improved raising and lowering of the semi-trailer landing gear.

Figure 1:
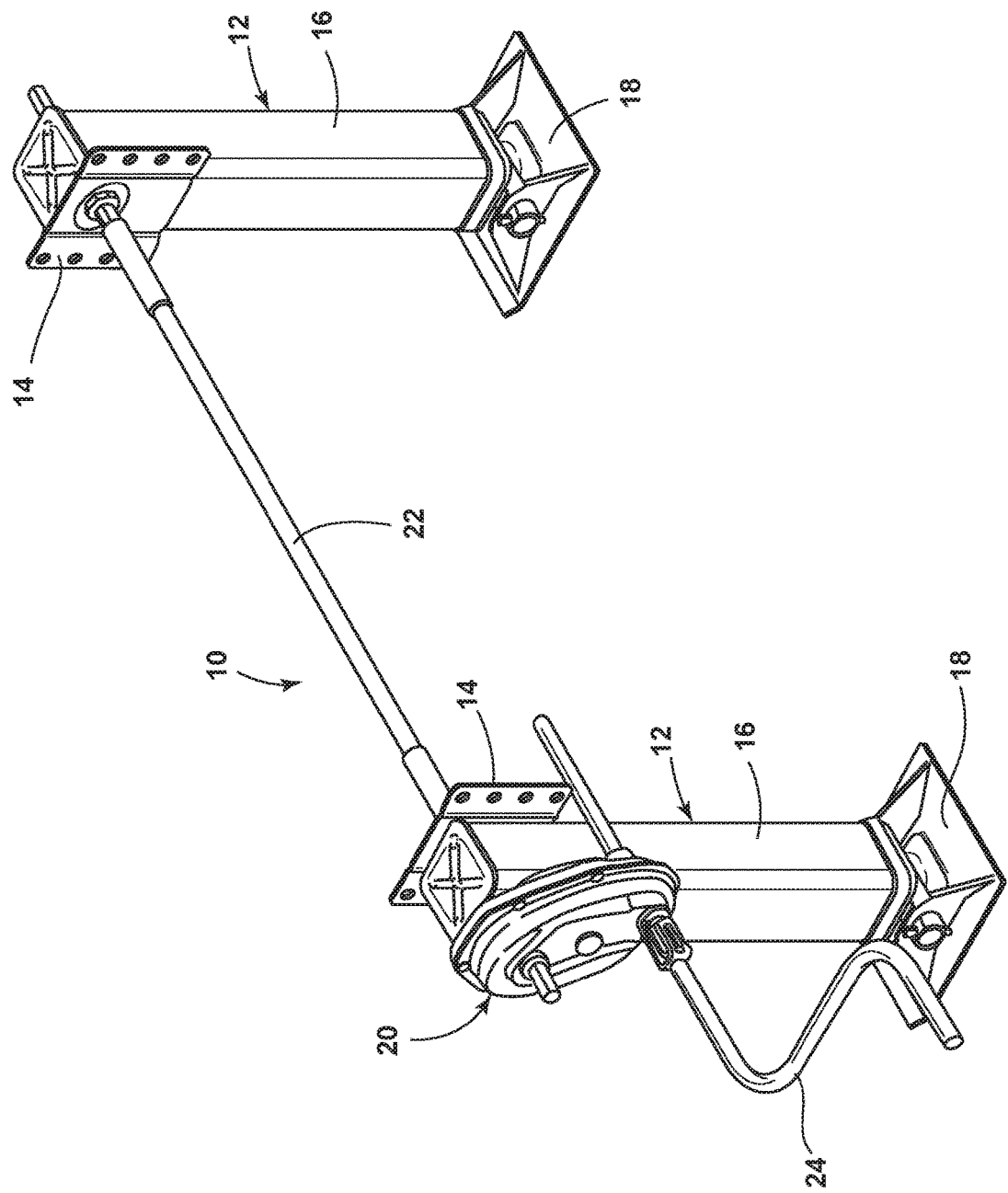
FIG. 1 is a perspective view of a conventional semi-trailer landing gear in the prior art.
Figure 2:
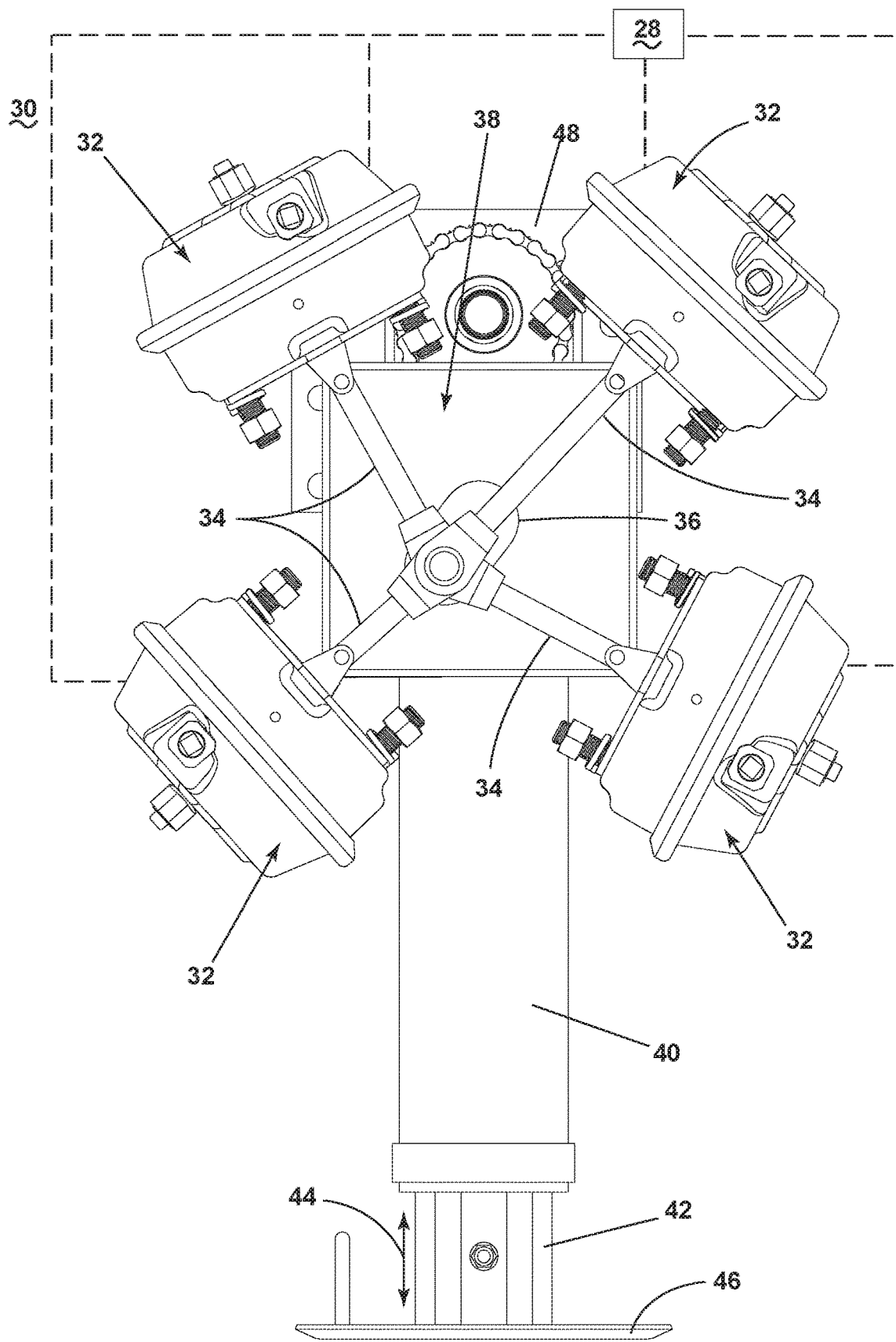
FIG. 2 is a front view of semi-trailer landing gear having four air drivers.

Referring now to FIG. 2, a semi-trailer landing gear 30 includes a set of actuators shown as four air drivers 32. The air drivers 32 can be air driven actuators, for example, while any type of actuator is contemplated, such as mechanically, fluid, or pump-driven actuators. Additionally, other suitable actuators are contemplated, such as any actuator that can be used to drive another element. One additional example can include an air spring. Each air drivers 32 includes an air driver shaft 34 coupled to a rotating crank 36. Operation of the air drivers 32 can drive the air driver shafts 34 to rotate the crank 36, thereby generating a torque of the crank 36. The air drivers 32 can be mounted on a mount system (not shown), where the mount system is any suitable structure to support and facilitate operation of the air drivers 32. For example, the mount system may be on an undercarriage of a trailer or on the landing gear of the trailer. Such a connection can be a movable connection to facilitate the actuation of the air driver shafts 34 in a rotating motion about the crank 36. More specifically, the air drivers 32 may need to pivot to drive the air driver shafts 34 relative to the rotation of the crank 36. In this way, a pivoting movement of the air drivers 32 or the air driver shafts 34 would permit rotational movement of the crank 36 while keeping the air driver shafts 34 coupled to the crank 36. A gearbox 38 is operably coupled to the crank 36.

A controller 28 can operably couple to the air drivers 32 to control operation of the air drivers 32. The connection between the controller 28 is schematically illustrated by broken line, while any suitable connection is contemplated. For example, an electrical connection can be provided between the air drivers 32 and the controller 28, providing for signal communication between them. In another example, the controller 28 can couple to a compressor and operate the compressor to selectively provide a volume of air to the air drivers 32 to drive the air drivers 32.

A housing 40 includes a leg 42 movable into and out of the housing 40, in a direction illustrated by arrows 44. A foot 46 couples to the leg 42 and is adapted to contact a surface such as a floor or the ground. Movement of the leg 42 moves the foot 46 up, effectively lowering the housing 40 relative to the surface, or down, effectively raising the housing 40 relative to the surface. A support 48 is connected to the housing 40 opposite of the foot 46 and can be configured to contact a semi-trailer (not shown). The gearbox 38 can be operably coupled to the leg 42 to raise and lower the leg 42 into and out of the housing 40, such that rotational movement of the crank 36 is imparted to the leg 42 to provide for raising or lowering of the leg 42. In this way, rotation of the crank 36 can be imparted from the set of air drivers 32 to the leg 42, to raise and lower the semi-trailer landing gear 30 for raising and lowering a semi-trailer.

Figure 3:
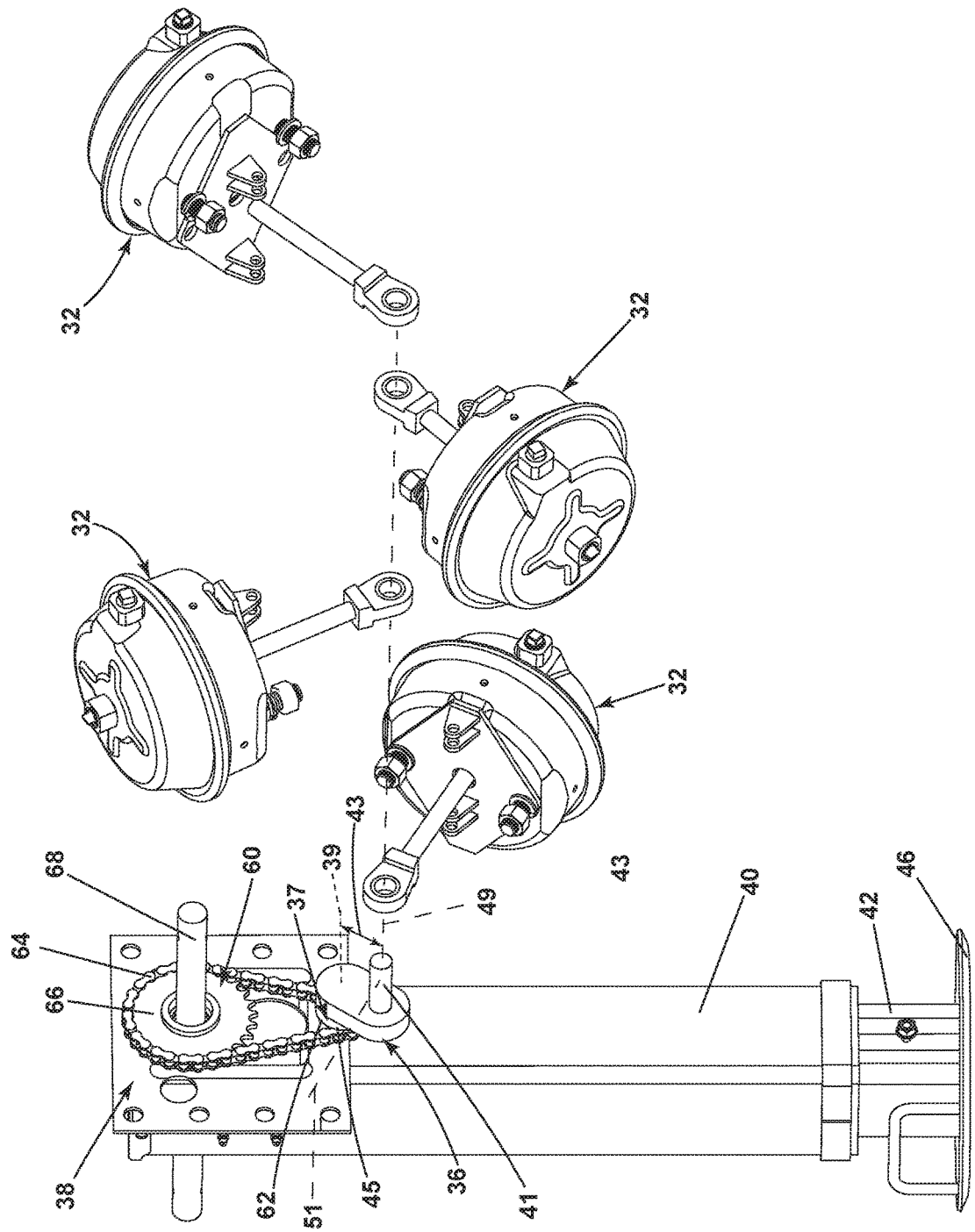
FIG. 3 is an exploded view of the semi-trailer landing gear of FIG. 2 having the air drivers exploded from a link coupled to a gear assembly.

Referring now to FIG. 3, the air drivers 32 are exploded from the crank 36 and a housing for the gearbox 38 has been removed exposing the interior components of the gearbox 38. The crank 36 includes a boss 37 at one end having an axis 39 about which the crank 36 rotates. A pin 41 to which the driver shafts 34 connect extends from the crank 36 and is spaced from the axis 39 along an imaginary crank line 43. The crank 36 can be sized and manufactured such that the crank line 43 can be about half the length of actuation of the actuating arm 34 during operation of the air drivers 32, for example, or can be at least half of the stroke length of the air driver 32. The pin 41 can also define a pin axis 49, arranged perpendicular to the axis 39 and spaced by the crank line 43.

An imaginary perpendicular line 51 can also be defined. The perpendicular line 51 can be arranged perpendicular to the crank line 43, extending in the direction or rotation of the crank 36 at the pin 41. Therefore, the perpendicular line 51 can rotate with the crank 36, while always remaining perpendicular to the crank line 43. The crank 36 also has a cam 45 centered on the axis 39 for a purpose to be explained later. The cam 45 can be part of the boss 37, and forming at least a portion of the crank 36. The gearbox 38 further includes a gear assembly 60 including a first gear 62 (substantially hidden in FIG. 3, see FIG. 4) mounted to the boss 37 of the crank 36, a gear chain 64, and a sprocket 66. Alternatively, it should be contemplated that the gear assembly 60 could include a gear system without the chain or sprocket, or could include a gear and chain assembly, or could include a belt and sheaves in non-limiting examples, while any system suitable to transfer rotation and torque from the crank 36 is contemplated. The first gear 62 is thus coupled to the crank 36 such that rotation of the crank 36 about axis 39 imparts rotation to the first gear 62. Rotation of the first gear 62 drives the gear chain 64, which rotates the sprocket 66. The first gear 62 and the sprocket 66 can be sized in such a way to alter or increase the torque provided from the first gear 62 to the sprocket 66 based upon the gear ratio between the two. Alternatively, the sprocket 66 can be replaced with a set of gears to define the gear ratio, and need not be a sprocket 66. In one non-limiting example, the gear ratio can be 3:1, while greater or lesser gear ratios are contemplated.

The sprocket 66 is coupled to an output shaft 68, such that rotation of the sprocket 66 rotates the output shaft 68. The output shaft 68 can be operably coupled to the leg 42 to raise and lower the leg 42 and foot 46 via the rotation imparted to the output shaft 68, the operation of which is further described in FIG. 4.

Figure 4:
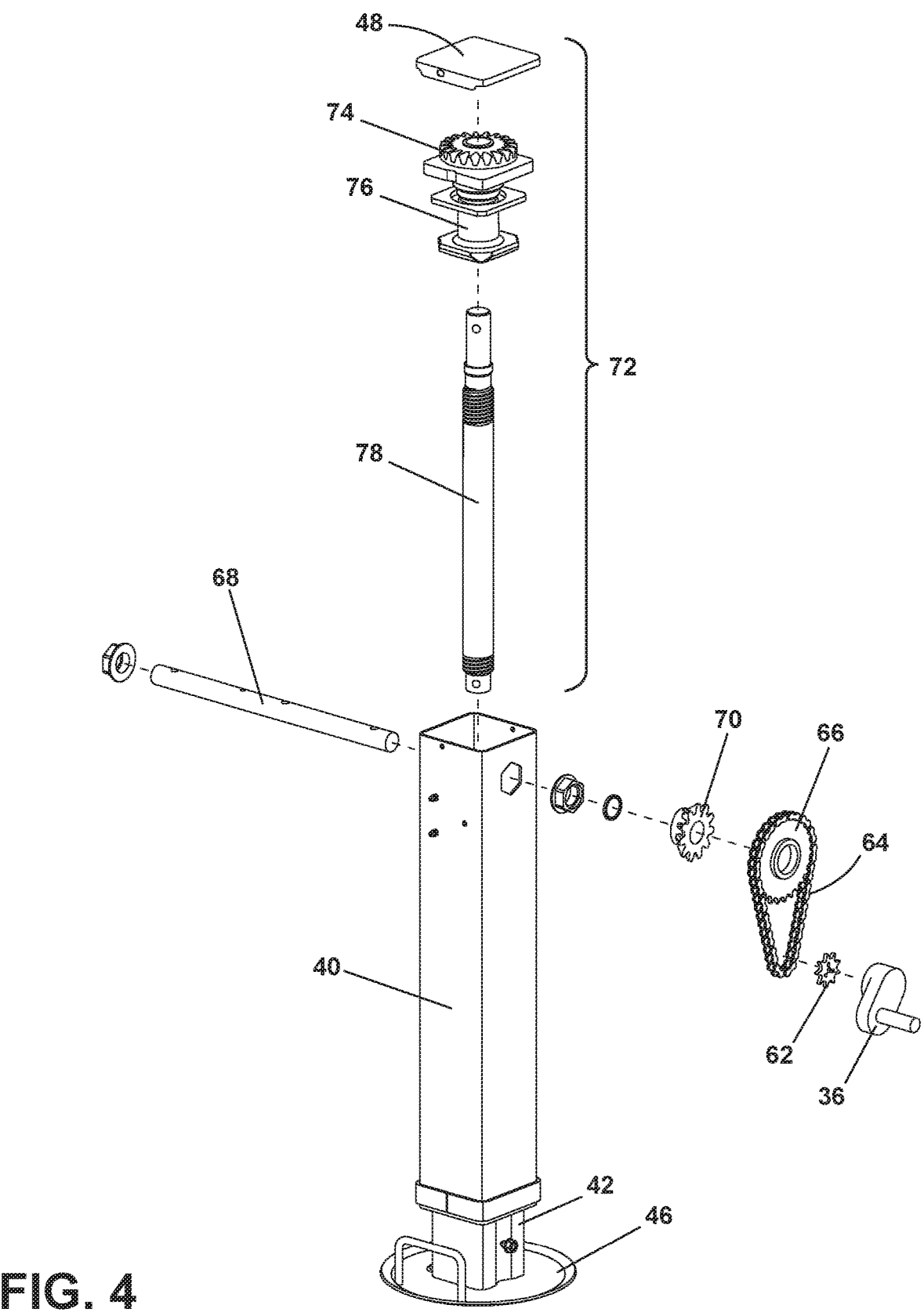
FIG. 4 is another exploded view of the gear assembly of FIG. 3.

Referring now to FIG. 4, the gear assembly 60 has been further exploded, and further includes a first bevel gear 70, which can be coupled to the output shaft 68, while spaced from the sprocket 66. An actuation assembly 72 can be housed within the housing 40 and operably coupled to the leg 42 and the foot 46. The actuation assembly 72 can include a second bevel gear 74 connected to a body 76. The second bevel gear 74 can operably couple to a driving shaft 78. Rotation of the second bevel gear 74 can drive the driving shaft 78 such that the driving shaft 78 moves in a longitudinal direction, specifically by a threaded interface between the driving shaft 78 and the second bevel gear 74. In this way, threaded rotation of the driving shaft 78 causes the leg 42 and the foot 46 to move up or down based upon rotational direction of the driving shaft 78.

Therefore, rotation of the gear assembly 60 from the set of air drivers 32 drives the output shaft 68, which drives the drive shaft 78 via the first and second bevel gears 70, 74. In this way, actuation of the air drivers 32 can effectively raise and lower the leg 42 and foot 46 relative to the housing 40.

In operation, a semi-trailer landing gear 30 can be positioned beneath the trailer of a semi-trailer. Operation of the air drivers 32 can be used to raise the housing 40 by pushing the leg 42 and foot 46 downward, raising the semi-trailer to permit a semi-tractor to attach to or detach from the semi-trailer. Furthermore, once detached, the semi-trailer can rest upon the semi-trailer landing gear 30 until additional usage or for loading/unloading.

Figure 5:
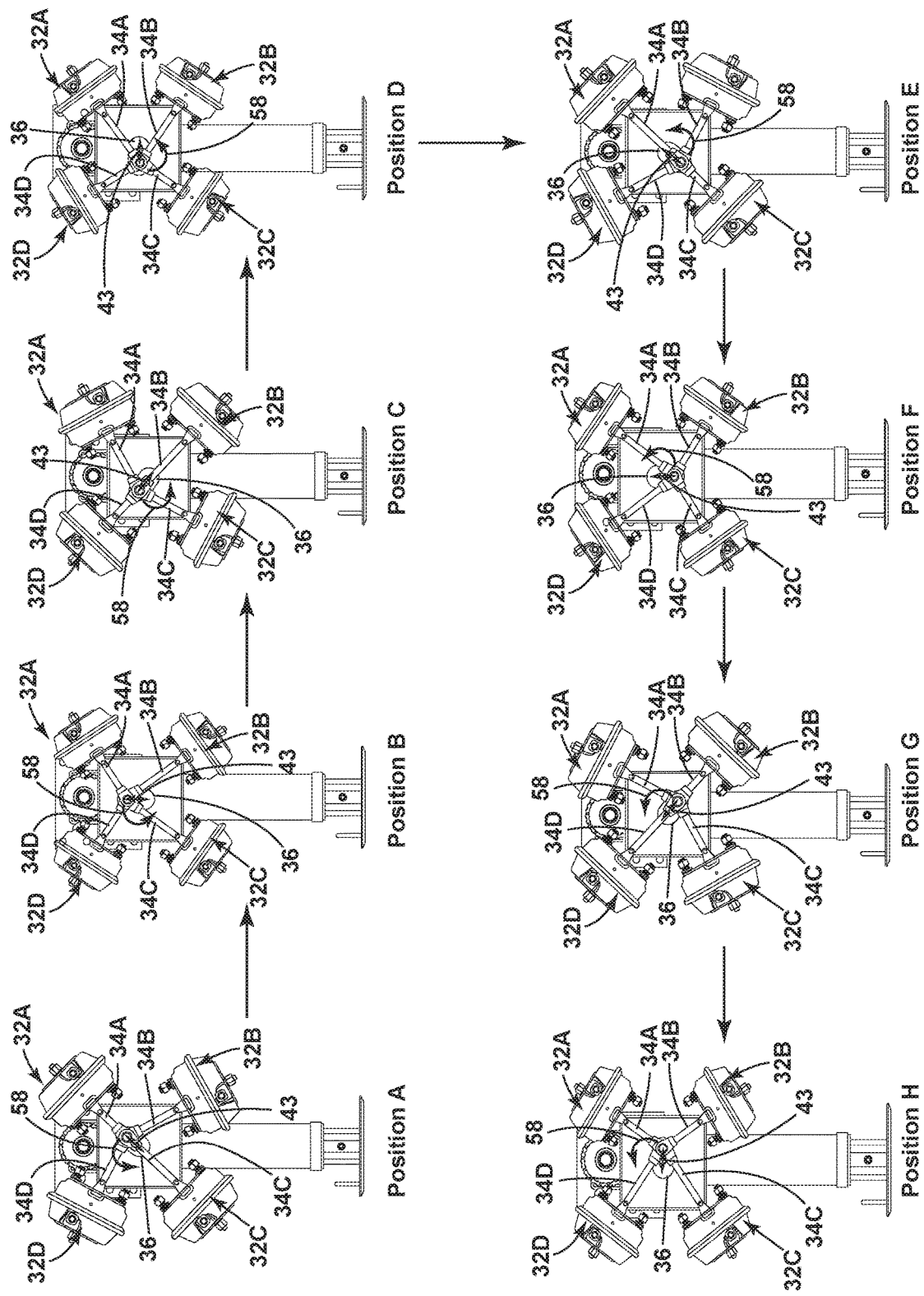
FIG. 5 is a timeline chart illustrating rotation of the crank of the semi-trailer landing gear of FIG. 2 as driven by the four air drivers for one revolution.

Referring now to FIG. 5, operation of the set of air drivers 32 can be explained. FIG. 5 depicts a series of operational positions for the set of air drivers 32 and air driver shafts 34 during one driven revolution of the crank 36, with the positions being labeled position A through position H, in sequential order. Each position A-H includes a rotational arrow 58 illustrating the rotation of the crank 36 and the crank line 43 illustrated as an arrow. It should be appreciated that as air is pressurized in a given air driver 32, the respective air driver shaft 34 is urged outwardly with a driving force, and when pressure in the given air driver 32 is relieved, the driving force dissipates and the air driver shaft 34 can be urged inwardly. Additionally, each air driver 32 will be labelled as air driver 32A-32D, and each corresponding air driver shaft 34 labelled as air driver shaft 34A-34D for clarity of description. As is appreciable, the crank 36 can be urged to rotate in a clockwise or counter-clockwise direction depending on whether the leg 42 is to be raised or lowered. In FIG. 5, it is assumed that counter-clockwise rotation (shown by arrow A) of the crank 36 will result in lowering the leg 42.

At position A, air drivers 32A and 32C are in a toggle condition. A toggle condition as used herein can be defined as a condition when the air driver shaft 34 of any given air driver 32 imparts no rotational force to the crank 36 as it is aligned with the crank 36 such that the rotational direction of the crank 36 is perpendicular to the particular air driver shaft, and therefore generates no torque. In position A, air driver shaft 34A has reached its maximum retraction into the air driver 32A while under no pressure. Air driver shaft 34D is receding into air driver 32D while under no pressure and air driver 32C has achieved its maximum extension when air pressure in air driver 32 C is relieved. Air driver 32B under air pressure is driving air driver shaft 34B in the direction of rotation A to impart a torque onto the crank 36.

As position A transitions through position B, air driver 32A begins to be pressurized, causing the driver shaft 34A to impart force to the crank 36, so that both air drivers 32A and 32B are driving the crank 36. Simultaneously, air driver shaft 34D continues to recede into air driver 32D, and air driver shaft 34C begins to recede into air driver 32C.

In position C, air driver shaft 34D has reached its maximum retraction into the air driver 32D while under no pressure. Air driver shaft 34C is receding into air driver 32C while under no pressure and air driver 32B has achieved its maximum extension when air pressure in air driver 32B is relieved. Air driver 32A under air pressure is driving air driver shaft 34B in the direction of rotation A to impart a torque onto the crank 36.

As position C transitions through position D, air driver 32D begins to be pressurized, causing the driver shaft 34D to impart force to the crank 36, so that both air drivers 32A and 32D are driving the crank 36. Simultaneously, air driver shaft 34C continues to recede into air driver 32C, and air driver shaft 34B begins to recede into air driver 32B.

In position E, air driver shaft 34C has reached its maximum retraction into the air driver 32C while under no pressure. Air driver shaft 34B is receding into air driver 32B while under no pressure and air driver 32A has achieved its maximum extension when air pressure in air driver 32A is relieved. Air driver 32D under air pressure is driving air driver shaft 34D in the direction of rotation A to impart a torque onto the crank 36.

As position E transitions through position F, air driver 32C begins to be pressurized, causing the driver shaft 34C to impart force to the crank 36, so that both air drivers 32D and 32C are driving the crank 36. Simultaneously, air driver shaft 34B continues to recede into air driver 32B, and air driver shaft 34A begins to recede into air driver 32A.

In position G, air driver shaft 34B has reached its maximum retraction into the air driver 32B while under no pressure. Air driver shaft 34A is receding into air driver 32A while under no pressure and air driver 32D has achieved its maximum extension when air pressure in air driver 32D is relieved. Air driver 32C under air pressure is driving air driver shaft 34C in the direction of rotation A to impart a torque onto the crank 36.

As position G transitions through position H, air driver 32B begins to be pressurized, causing the driver shaft 34B to impart force to the crank 36, so that both air drivers 32C and 32B are driving the crank 36. Simultaneously, air driver shaft 34D continues to recede into air driver 32D, and air driver shaft 34C begins to recede into air driver 32C. Continued rotation of the crank then reaches position A again.

From FIG. 5, it should be appreciated that regardless of the rotational position of the crank 36, at least one air driver 32 is always providing a driving force to the crank 36 so a torque is consistently generated by the set of air drivers 32. A valve assembly can be used to control sequential operation of the air drivers 32, such as selectively supplying a volume of air to drive the air drivers 32 to achieve the rotation depicted in positions A-H based upon the current position of the set of air drivers 32. Therefore, the air drivers 32 provide a continuous torque to the crank 36, to provide a continuous drive to the drive shaft 78 of FIG. 4 to either raise or lower the semi-trailer landing gear.

In order to rotate in the opposite direction, the supply of air or otherwise used to drive the air drivers 32 can be reversed, such as reversing the order in which air is supplied to the air drivers 32. In this way, the rotation of the crank 36 can be changed, and therefore, a clockwise or counter-clockwise rotational direction can be determined, which can be used to either raise or lower the semi-trailer landing gear 30. In one example, a controller (not shown) can be operably coupled to the air drivers 32 or to an air supply used to drive the air drivers 32, which can be used to control the supply of air, thereby controlling the rotational direction of the crank 36.

In every position in FIG. 5 one can visualize the crank line 43 on which the pin 41 and the rotating axis 39 of the crank 36 are positioned and can also visualize a line 51 perpendicular to the crank line 43 at the pin 41. It can be seen that whenever the axis of a driver shaft 34 is at an acute angle behind the perpendicular line 51 relative to the direction of rotation A, it will be applying a torque to crank 36. In this way, a constant torque is provided to the crank 36 from at least one of the air drivers 32, which maintains a constant torque for the landing gear 30.

Figure 6:
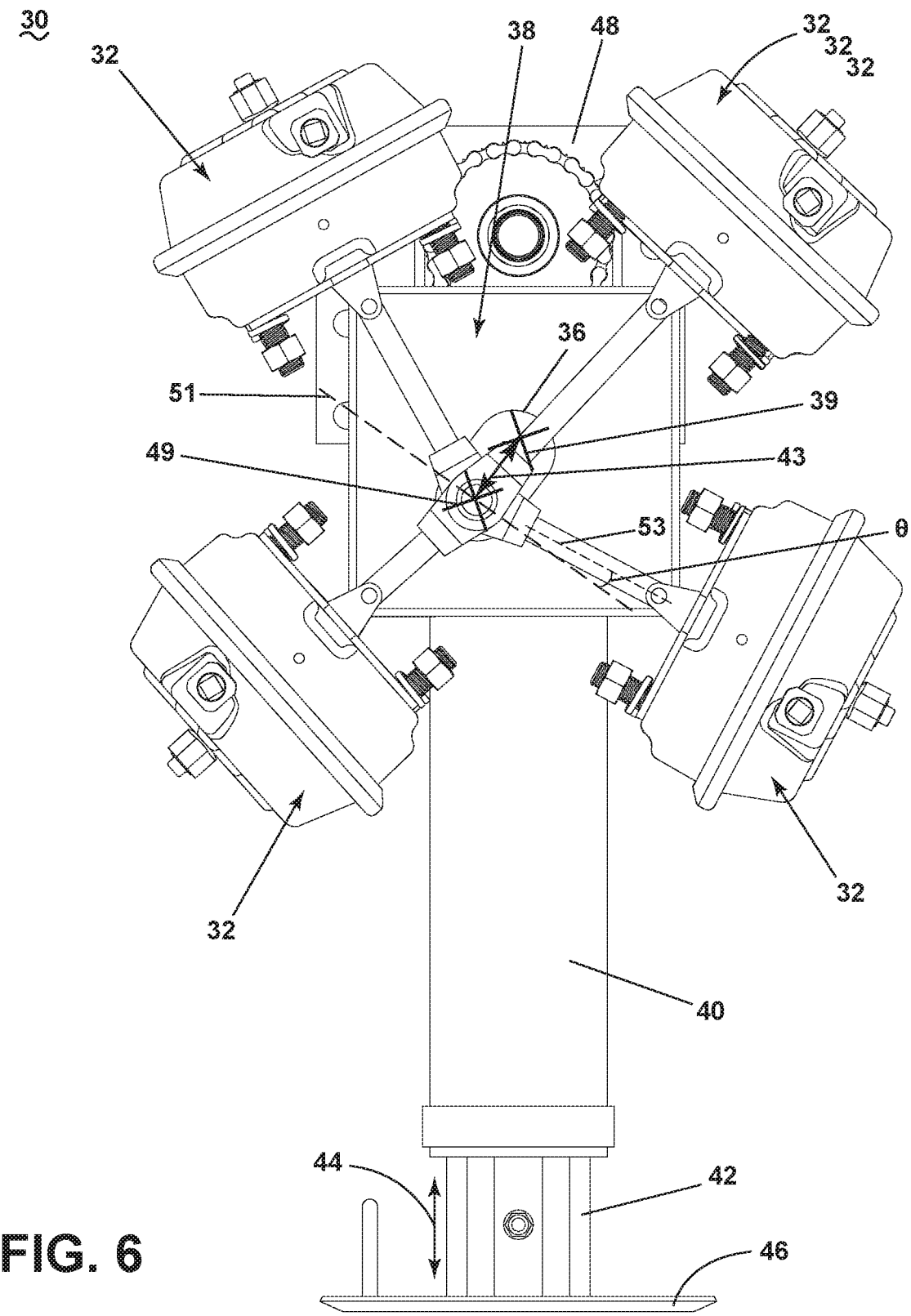
FIG. 6 is a front view of the assembled gear assembly of FIG. 2, illustrating an acute angle for one of the air drivers of FIG. 5 relative to the crank.

Referring now to FIG. 6, the arrangement of the acute angle can be fully appreciated. The first axis 39 is illustrated with an "X" and extends into and out of the page, and the pin axis 49 is also illustrated with an "X" and extends into and out of the page. The crank line 43 is shown as an arrow extending between the first axis 39 and the pin axis 49. The perpendicular line 51 is provided in broken line perpendicular to the crank line 43. An shaft axis 53 can be defined along the longitudinal extent of the shaft 34 of the air driver 32. An acute angle θ can be defined between the shaft axis 53 and the perpendicular line 51 being perpendicular to the crank line 43. As is appreciable in FIG. 5, one shaft 34 of the at least one air drivers 32 is always positioned at the acute angle θ such that at least one air driver 32 is always pressurized and driving rotation of the crank 36. In this way, a constant torque can be provided from the set of air drivers 32, as arranging at least one shaft 34 of the air drivers 32 at the acute angle θ ensures that at least one air driver 32 is always driving rotation of the crank 36.

Additionally, as one acting air driver 32 is decreasing its torque after rotating beyond the maximum torque position, the next air driver 32 begins increasing torque while the current acting air driver is decreasing torque. In this way, a greater torque is achieved over time, without suffering from a decreasing torque from one air driver alone. More specifically, each air driver 32 acts on the crank from 1-degree up to 180-degrees defined as an angular offset from the crank line 43 from the shaft axis 53 of any given air driver 32. During the movement from 1-degree to 90-degrees, the torque increases, having a maximum torque at the 90-degree position. During movement from 90-degrees up to 180-degrees, the torque decreases, with a zero torque at 180-degrees. Due to the four-part nature of the landing gear assembly 30, there will always be an overlap among at least two air drivers 32. More specifically, while one air driver 32 has a decreasing torque from the 90-degree to 180-degree range, the next air driver 32 includes an increasing torque from the 0-degree to the 90-degree position defining an overlap in torque production among the two air drivers 32. In this way, while one air driver 32 is decreasing torque, the next air driver 32 is increasing torque to ensure a constant driving torque that is suited to continually drive the crank 36 even while the torque decreases from one air driver 32. Such a similar overlap can also be applied to a varying number of air drivers 32, such as three air drivers as described in FIG. 10, or two, dual-acting air drivers described in FIG. 14, while the particular overlap ranges will vary based upon the number of air drivers utilized.

Figure 7:
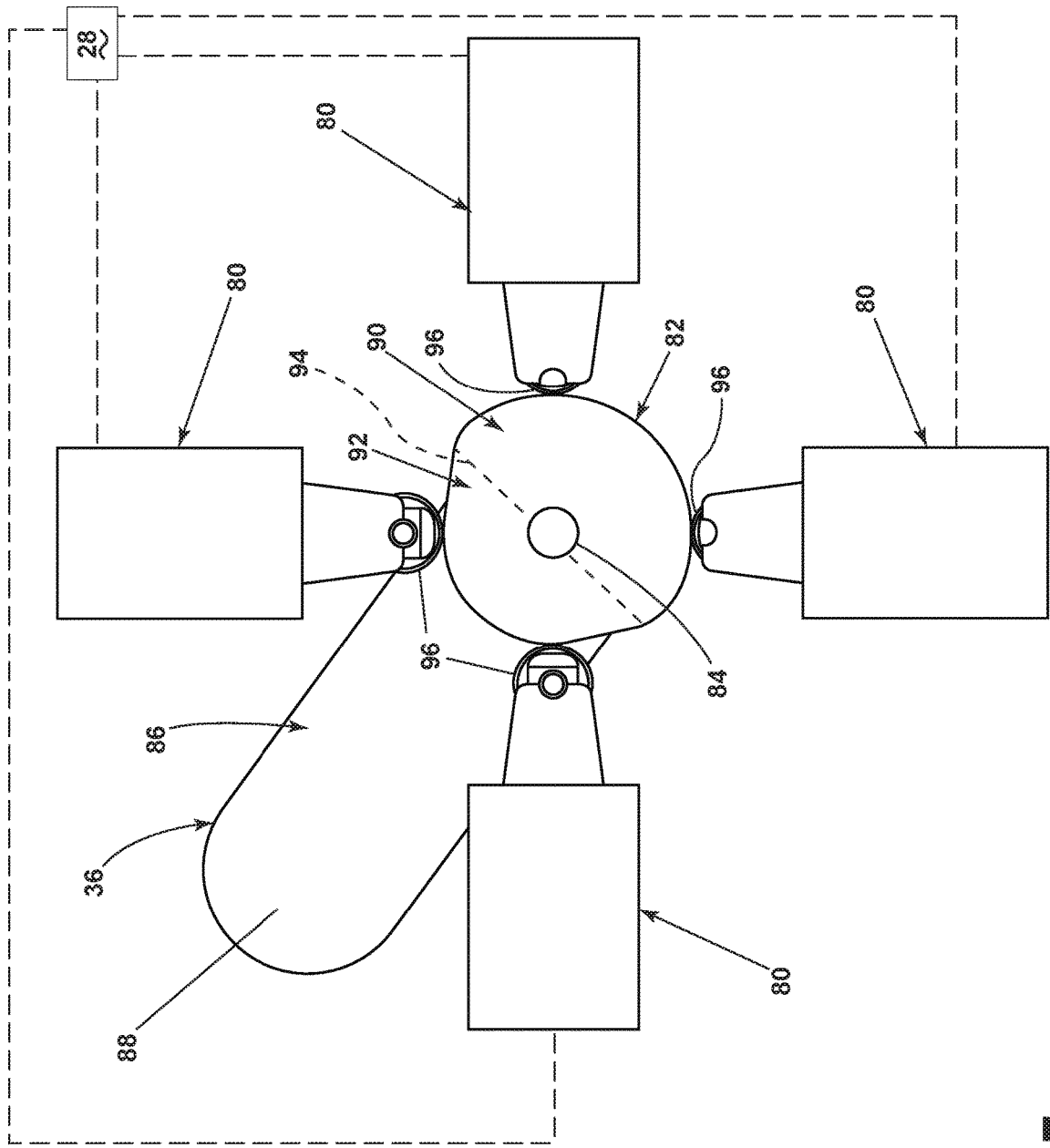
FIG. 7 is a schematic view of an exemplary crank operably connected to four valves operable to control operation of four air drivers for driving the crank.

Referring now to FIG. 7, one way to control operation of the set of air drivers 32 is to utilize a set of valves 80 operably connected to the crank 36, such that the position of the crank 36 operates the valves 80 to selectively operate the set of air drivers 32 in the proper sequential order. As such, the semi-trailer landing gear 30 can be self-operated and self-controlled.

The crank 36 includes a cam body 82 having a rotational center 84 at the rotational axis 39. A shaft extension 86 extends from the cam body 82 and a mount shaft 88 forms the extension 86 to which the set of air drivers 32 can attach. More specifically, the shaft 34 of the air drivers 32 can couple to the crank 36 at the mount shaft 88 on the extension 86. The cam body 82 can be a misshapen circle or ovoid, such that a first half 90 of the body includes a radius or substantially radial length relative to the rotational center 84 that is longer than a radius or radial length in a second half of the body 92. Stated another way, the first half 90 can form an asymmetric portion for the crank 36. The first and second halves 90, 92 are delineated with a dashed line 94, for ease of understanding and identification.

The set of valves 80 can be mounted to a structure to position the valves 80 adjacent the crank 36, while permitting rotation of the crank 36 and the cam body 82 relative to the valves 80. In one example, the valves 80 can mount to the gearbox 38 of FIG. 2, while other mounting assemblies are contemplated. Each of the valves 80 can include a button 96, or other similar toggle, actuator, or switch that is depressed by the first half 90 of the body 82 but not depressed by the second half 92 of the body 82. Each of the valves 80 can be operably coupled to one of the air drivers 32 to control operation of the air drivers 32 by position of the button 96, such as activating an air driver 32 when the button 96 is depressed and deactivating an air driver 32 when the button 96 is not depressed. In this way, as the air drivers 32 drive the crank 36, the cam body 82 of the crank 36 will automatically open and close the valves 80 in a predetermined manner. Such opening and closing of the valves 80 by the crank 36 self-controls operation of the air drivers 32 operably coupled to the valves 80. As the crank 36 further rotates, the valves 80 will selectively activate or deactivate in predetermined relationship to continue operation of the semi-trailer landing gear 30, using the first half 90 and the second half 92 of the cam body 82 of the crank 36 as controller. The buttons 96 can be biased outwardly, to return to the initial, non-depressed position when not confronting the first half of the body 90. Such a method of control can provide for a simpler, consistent, less expensive control means, as opposed to that of an electronic controller requiring a circuit board and related components.

The valves 80 can be operably coupled to the controller 28 or configured to supply an electrical signal to the a controller 28, which can control operation of the air drivers 32 based upon the signal sent from the valves 80. The controller 28 can be in communication with both the valves 80 and the air drivers 32 to control operation of the air drivers 32 based upon the position or a signal send from the valves 80 when operated. In such an example, the valves 80 need not be valves in the conventional sense, but can be button or sensors configured to generate a signal based upon the rotational position of the crank 36, which can be used to control operation of the air drivers 32. Alternatively, the valves 80 can be air valves, for example, which can be opened or closed to supply a volume of air to one or more of the air drivers 32, providing for direct operation of the air drivers 32 based upon the position of the crank 36.

Figure 8:
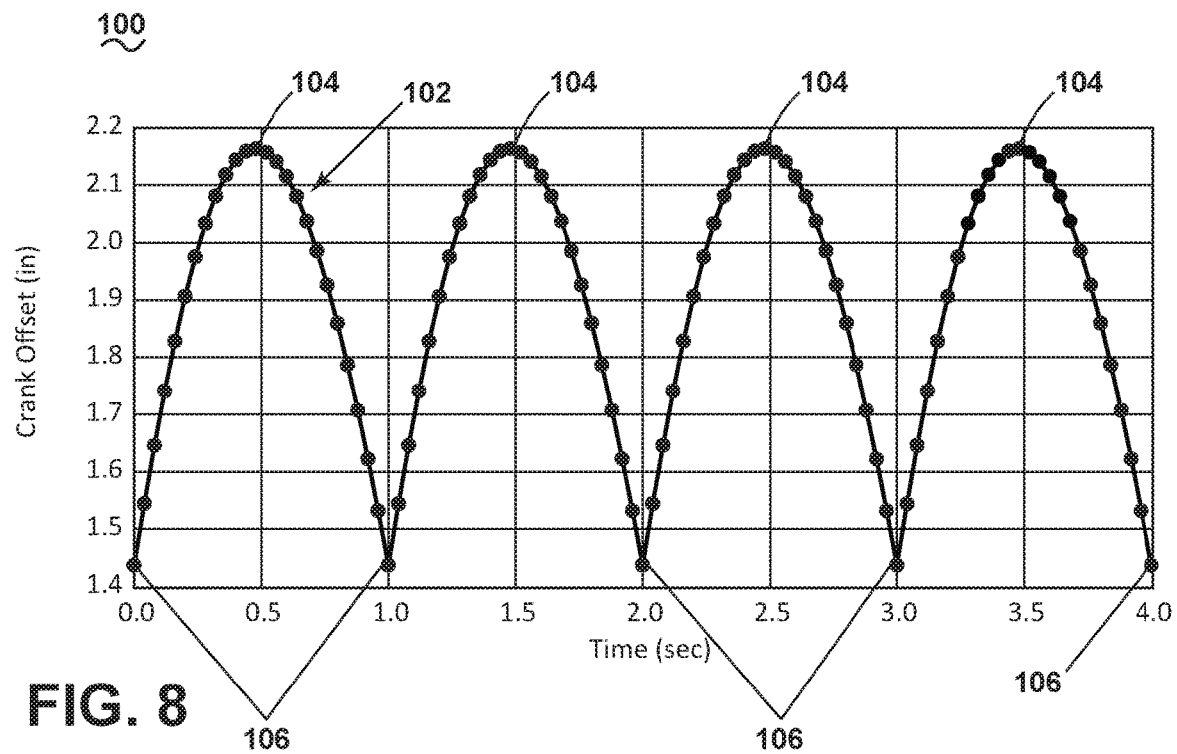
FIG. 8 is a plot showing crank offset over time for the semi-trailer landing gear of FIG. 2.

Referring now to FIG. 8, a first graph 100 includes a plot 102 showing crank offset of the crank 36 in inches over time in seconds. The crank offset in inches is representative of the offset of the shafts 34 of the air drivers 32 from aligned with the rotational center or center of action 84 of rotation of the crank 36. In this way, a greater value for the crank offset represents a greater displacement from the driving direction of motion from the center of action 84 of the crank 36. For example, a maximum crank offset, indicated at 104 of a value of about 2.15 inches (2.54 centimeters) indicates that the sum of the air driver shafts 34 of all air drivers 32 is at a maximum offset from the rotational center 84 of the crank 36. The minimum crank offset, indicated at 106, can be representative of the position of the sum of the air driver shafts 34 of all air drivers 32 is at a minimum offset from the rotational center 84 of the crank 36. The minimum crank offset 106 can be about 1.45 inches (3.68 centimeters), for example. However, such a value is merely exemplary, and can be variable based upon the particular sizing of the crank 36, air drivers 32, and spacing or positioning of the related parts.

As the air drivers 32 drive the crank 36, the offset varies between the minimum 106 and the maximum 104, as indicated by the plot 102, while never having a zero total crank offset. In this way, an offset is constantly maintained to ensure that a driving force is constantly being applied to the crank 36 via the air drivers 32. While the maximum crank offset 104 is shown as about 2.15 inches and the minimum crank offset 106 is shown as about 1.45 inches, it should be appreciated that different offsets are contemplated, and that the offsets shown in FIG. 8 are resultant of the particular geometry and organization of the air drivers 32. In this way, variables such as air driver pressure, air driver shaft 34 length, or position can be varied to vary the total offset. Therefore, it should be understood that FIG. 8 is exemplary, and the implementation should not be limited to that as shown in FIG. 8.

Figure 9:
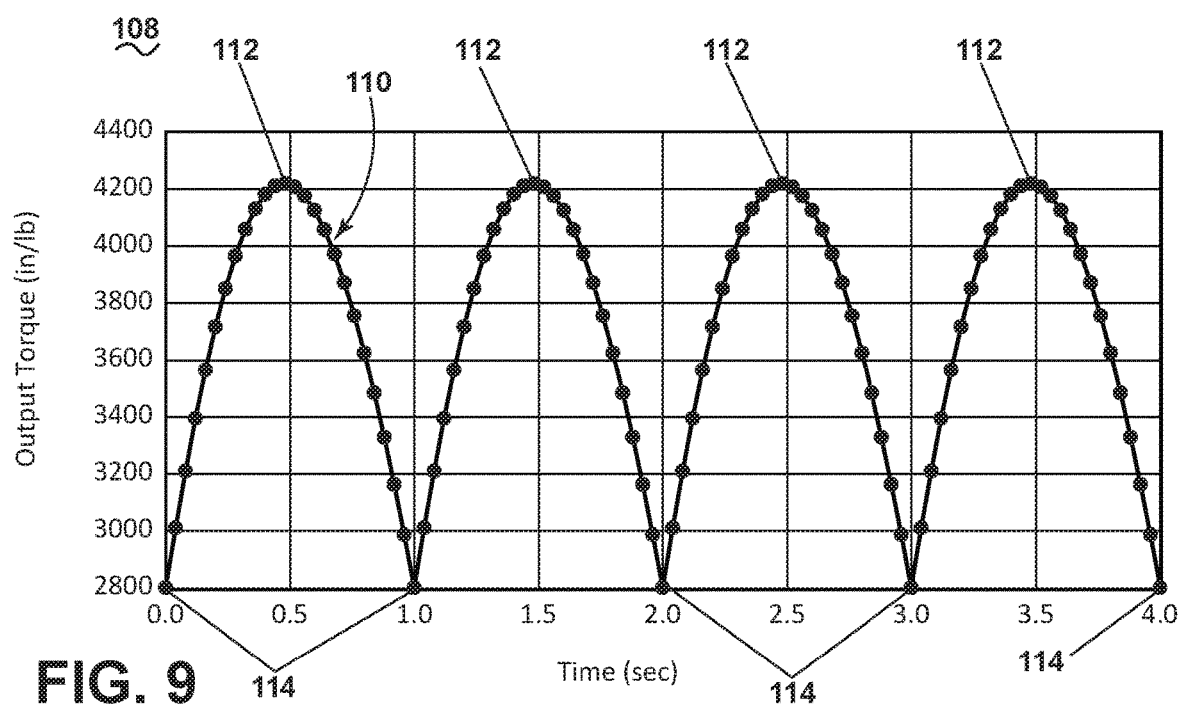
FIG. 9 is another plot showing torque output over time for the semi-trailer landing gear of FIG. 2.

Referring now to FIG. 9, another graph 108 includes a plot 110 showing an output torque in inches per pound (in/lb) over time in seconds, where one in/lb is equal to 0.113 newton meters (Nm) and the time passes as the crank 36 rotates. As is appreciable in comparison to the plot 102 of FIG. 8, the torque output is directly proportional to the crank offset position. A greater crank offset provides for a greater torque, while a lesser crank offset provides for a lesser torque. As should be appreciated, the torque is never zero, as the crank offset is never zero. In this way, rotational driving of the crank 36 is constantly maintained with the set of air drivers 32 varying between offset positions. While a maximum torque 112 is shown as about 4200 in/lb (475 Nm), and a minimum torque 114 is shown as about 2800 in/lb (316 Nm), it should be understood that the torque can be varied, based upon air driver pressure, air driver shaft length 34, positional organization of the air driver 32, as well as the gear ratio of the gear assembly 60, and it should be understood that the torque as shown is exemplary, and can be varied such that the disclosure should not be limited based upon that as shown in FIG. 9.

The semi-trailer landing gear 30 as described herein provides for an improved torque output for driving a crank 36 for raising and lowering the a semi-tractor-trailer. The organization and control of the set of air drivers 32 provides for a constant output of torque that can be maintained over time, utilizing a constant rotational offset with the set of air drivers 32. In this way, a greater, more consistent torque is provided to the crank 36, which can be provided to the output shaft 68 via the gear assembly 60, which can be used to consistently drive the drive shaft 78 to raise or lower the semi-trailer landing gear 30. Additionally, the user of the user of the valve system in concert with the body 82 of the crank 36 can provide for self-control of the air drivers 32, which can provide or a lesser cost for the semi-trailer landing gear 30 as well as simpler use.

Figure 10:
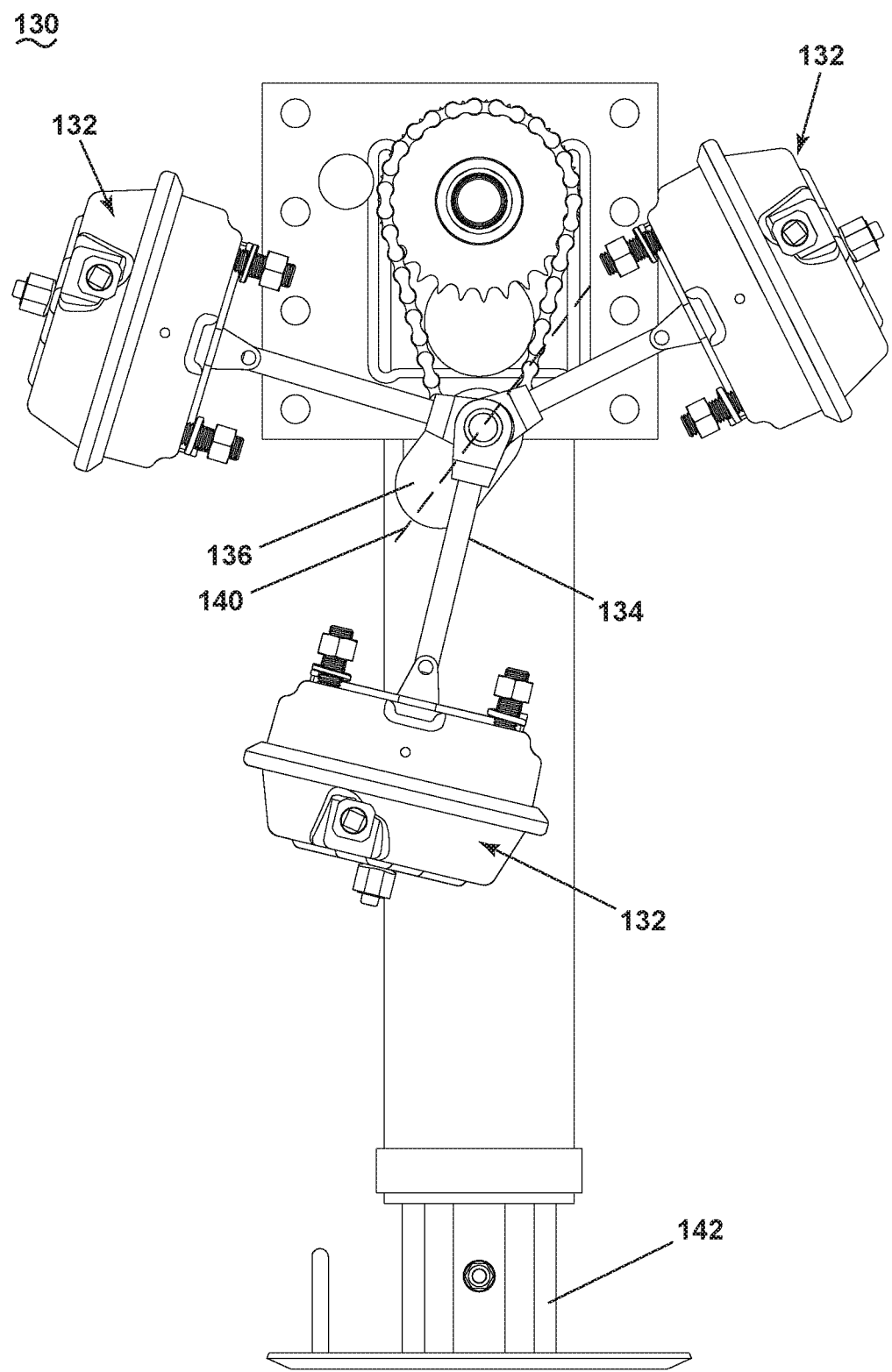
FIG. 10 is a front view of a semi-trailer landing gear having three air drivers.

Referring now to FIG. 10, another semi-trailer landing gear 130 is shown and can be substantially similar to the semi-trailer landing gear 30 of FIGS. 2-9. As such, similar numerals will be used to describe similar elements, except for the crank line indicated as 140, increased by a value of one hundred, and the discussion will be limited to differences between the two. More specifically, FIG. 10 includes the semi-trailer landing gear 130 with a set of three air drivers 132 as opposed to four air drivers 32 of FIGS. 2-9. As such, only three air drivers 132 operably couple to a crank 136 to drive the crank 136. The remainder of the semi-trailer landing gear 130 can be substantially similar to that of the semi-trailer landing gear 30 of FIGS. 2-9. The arrangement of the three air drivers provides that when one actuator shaft 134 is aligned with a crank line 140 defined along the crank 136, the remaining two actuator shafts 134 are offset from the crank line 140. In this way, at least one air driver 132 is always at an acute angle relative to a line perpendicular to the crank line 140 in the direction of rotation, similar to that discussed in reference to FIG. 6, constantly driving rotation of the crank 136 and imparting a torque onto the crank 136.

Figure 11:
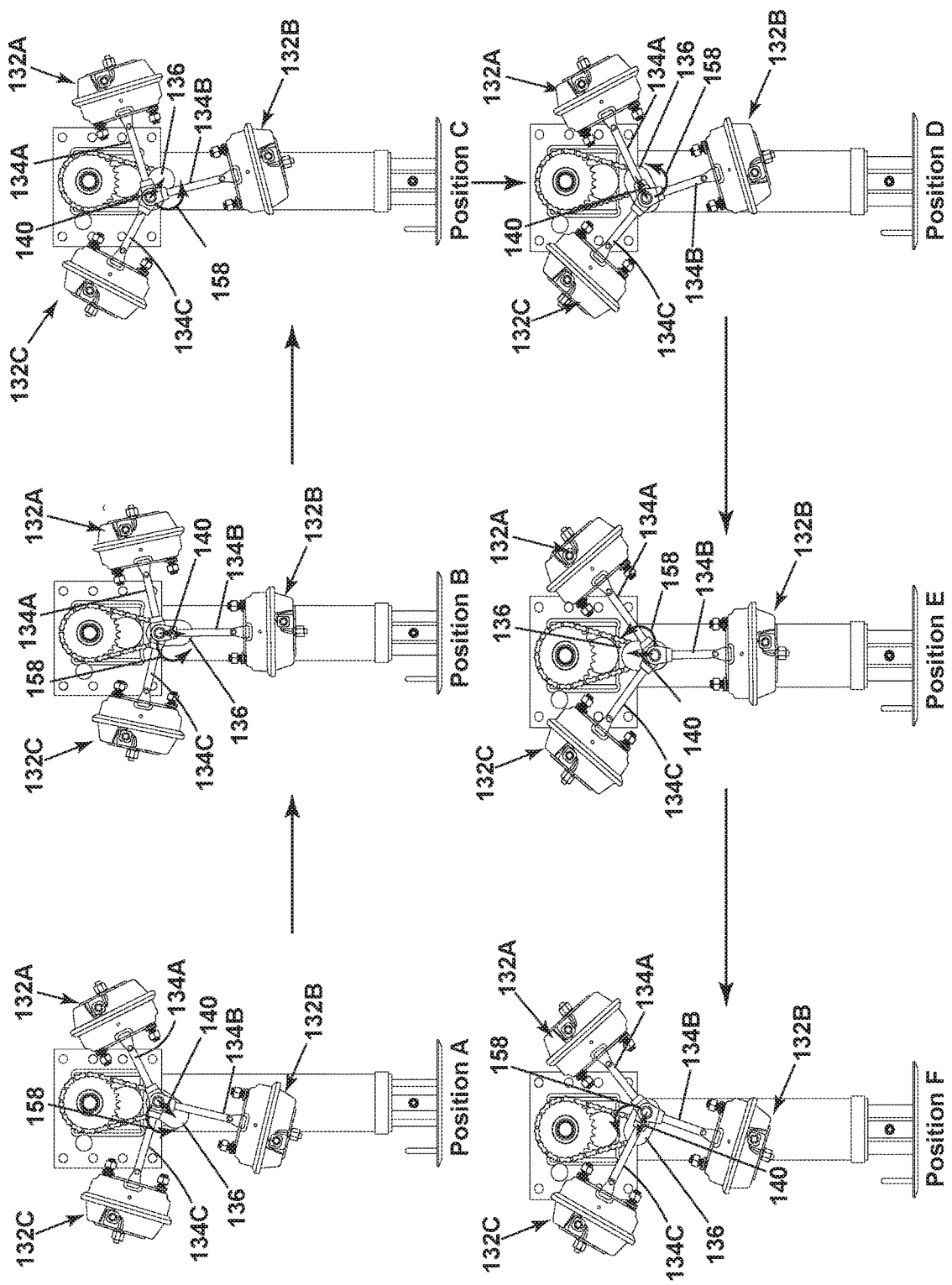
FIG. 11 is a timeline chart illustrating rotation of a crank of the semi-trailer landing great of FIG. 10 as driven by the three air drivers for one revolution.

Referring now to FIG. 11, operation of the set of air drivers 132 can be explained. FIG. 11 depicts a series of operational positions for the set of air drivers 132 and respective air driver shafts 134 during one driven revolution of the crank 136, with positions being labeled position A through position F, in sequential order. A directional arrow 158 identifies the direction of rotation, and the crank line 140 is represented with an arrow. It should be appreciated that the air is pressurized in a given air driver 132, and the respective air driver shaft 134 is driven outwardly with a driving force, and when pressure in the given air driver 132 is relieved, the driving force dissipates and the air driver shaft 134 can be urged inwardly, while it is contemplated that each air driver 132 can operate by pulling the air driver shaft 134 inwardly. Additionally, each air driver 132 will be labelled as air driver 132A-132C, and each air driver shaft will be labelled as air driver shaft 134A-134C, for clarity of description. As is appreciable, the crank 136 can be urged to rotate in a clockwise or counter-clockwise direction depending on whether the leg 142 is to be raised or lowered. In FIG. 11, it is assumed that counter-clockwise rotation of the crank will result in raising the leg 142.

At position A, air driver 132A is in a toggle condition, fully retracted. In this position, air driver shaft 134A has reached its maximum retraction into air driver 132A, while under no pressure. At the same time, the air driver shaft 134C of air driver 132C is receding into the air driver 132C under no pressure, while the air driver 132B is driving rotation of the crank 136 under pressure to impart a torque onto the crank 136. Air driver shaft 134B is at an acute angle behind a line perpendicular to a crank line in the direction of rotation. As the crank 136 rotates, air driver 132A begins to drive rotation of the crank 136.

At position B, air driver 132B is in a toggle condition, with the air driver shaft 134B fully extended, and under no pressure, while air driver 132A continues to drive rotation of the crank 136 under pressure. The shaft 134C of air driver 132C continues to retract. As the crank 136 rotates, the air driver shaft 134B of air driver 132B begins to retract.

At position C, air driver 132A continues to drive rotation of the crank 136, while air driver shaft 134C is fully retracted into the air driver 132C and under no pressure and in a toggle condition. Air driver shaft 134B continues to retract into air driver 132B, under no pressure. At position D, air driver 132C moves into an acute angle behind a line perpendicular to a crank line in the direction of rotation, and begins to drive rotation of the crank 136, while air driver 132A moves to a toggle position, fully extended and under no pressure. Air driver 132B continues to retract and is under no pressure.

At position E, air driver 132B is in a toggle condition, fully retracted and under no pressure. Air driver 132C continues to drive rotation of the crank 136, while air driver 132A is retracting and under no pressure. Finally, at position F, air driver 132B moves into an acute angle behind a line perpendicular to the crank line in the direction of rotation, and begins to drive rotation of the crank 136. Air driver 132A continues to retract under no pressure, while air driver 132C has reached a toggle position, fully extended, and begins to retract while under no pressure. From position F, the rotation will return to position A, continuing rotation of the crank 136. In this way, one air driver is always driving the crank 136 as one air driver 132 is always at an acute angle behind a line perpendicular to the crank line in the direction of rotation, while other air drivers are in the toggle condition, or retracting under no pressure in preparation for driving rotation.

Figure 12:
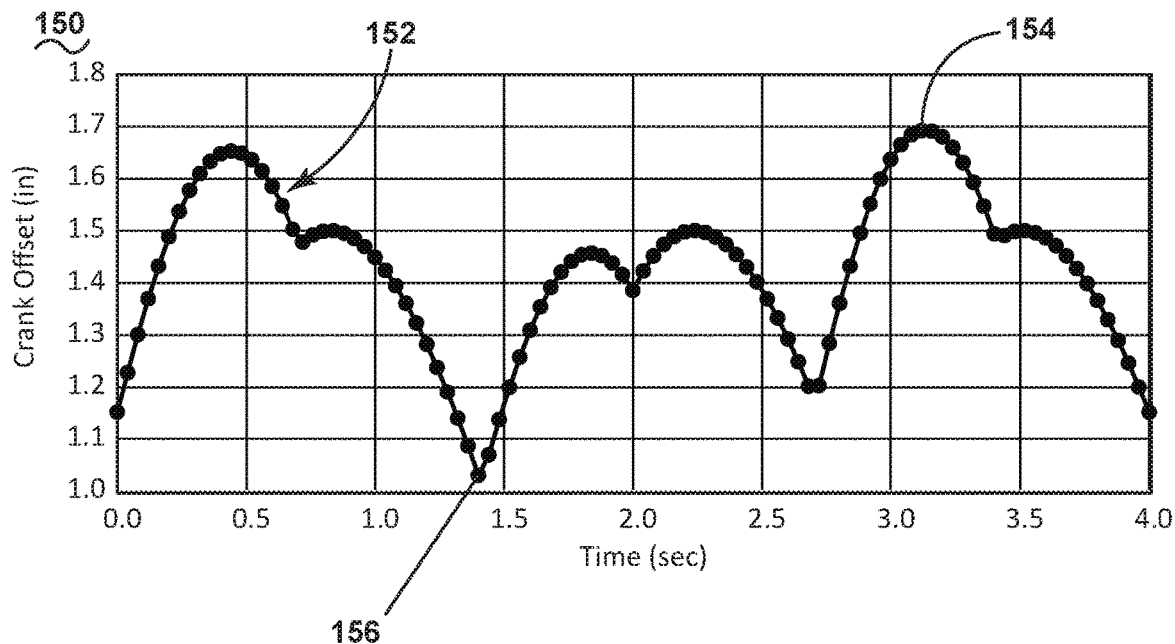
FIG. 12 is a plot showing crank offset over time for the semi-trailer landing gear of FIG. 10.

Referring now to FIG. 12, a first graph 150 includes a plot 152 showing crank offset in inches over time in seconds. The crank offset in inches is representative of the offset from the rotational center or center of action of the crank 136 of FIG. 11. In this way, a greater value for the crank offset represents a greater displacement from the driving direction of motion from the center of action of the crank 136. For example, a maximum crank offset, indicated at 154, has a values of about 1.7 inches (4.3 centimeters) indicates that the sum of the air driver shafts 134 of all air drivers 132 is at a maximum offset from the rotational center of the crank 136.

The minimum crank offset, indicated at 156, is about 1.025 inches (2.6 centimeters), for example.

As the crank 136 is rotatably driven by the air drivers 132, the offset varies between maximum and minimum offset 154, 156, in a substantially periodic manner. In this way, a constant, positive crank offset ensures that a constant driving force or torque is applied to the crank 136. The non-uniform plot 152 can be resultant of an angular offset or positional offset of the mount position of the air drivers 132. A uniform organization of the air drivers 132 can provide for a uniform periodic distribution for plot 152, while a slight offset in position or organization can result in the slight variation in the periodic values for the plot 152. More specifically, a uniform periodic plot can have equal spacing between air drivers 132 by 120-degrees, while a variation from such spacing or even shaft distance can provide for the variation in the plot 152.

Figure 13:
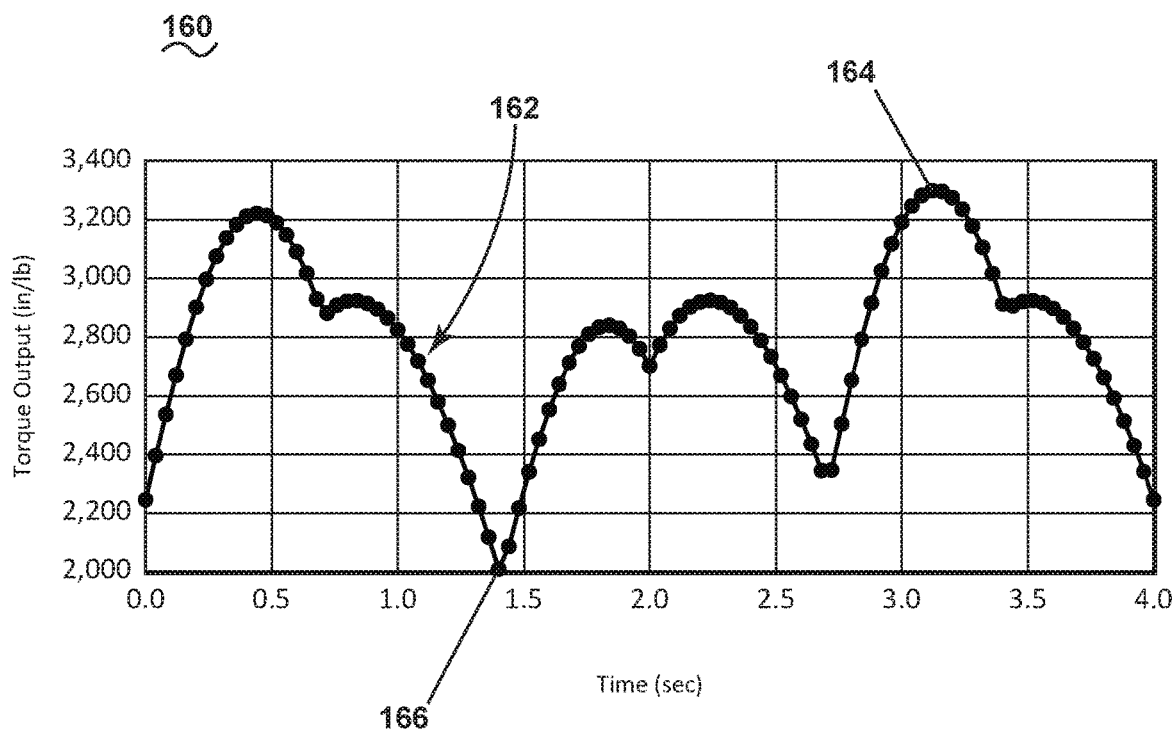
FIG. 13 is another plot showing torque output over time for the semi-trailer landing gear of FIG. 10.

Referring now to FIG. 13, another graph 160 includes a plot 162 showing an output torque in inches per pound (in/lb) over time in seconds, where one in/lb is equal to 0.113 newton meters (Nm) and the time passes as the crank 136 rotates. As is appreciable in comparison to the plot 152 of FIG. 12, the torque output is directly proportional to the crank offset position. A greater crank offset provides for a greater torque, while a lesser crank offset provides for a lesser torque. As should be appreciated, the torque is never zero, as the crank offset is never zero. In this way, rotational driving of the crank 136 is constantly maintained with the set of air drivers 132 varying between offset positions, as illustrated in FIG. 11. While the maximum torque 164 as shown is about 3300 in/lb (373 Nm) and the minimum torque 166 is about 2000 in/lb (226 Nm), it should be understood that the torque can be varied, based upon air driver pressure, air driver shaft length, or positional organization of the air drivers 132, and it should be understood that the torque as shown is exemplary, and can be varied such that the disclosure should not be limited based upon that as shown in FIG. 13.

Figure 14:
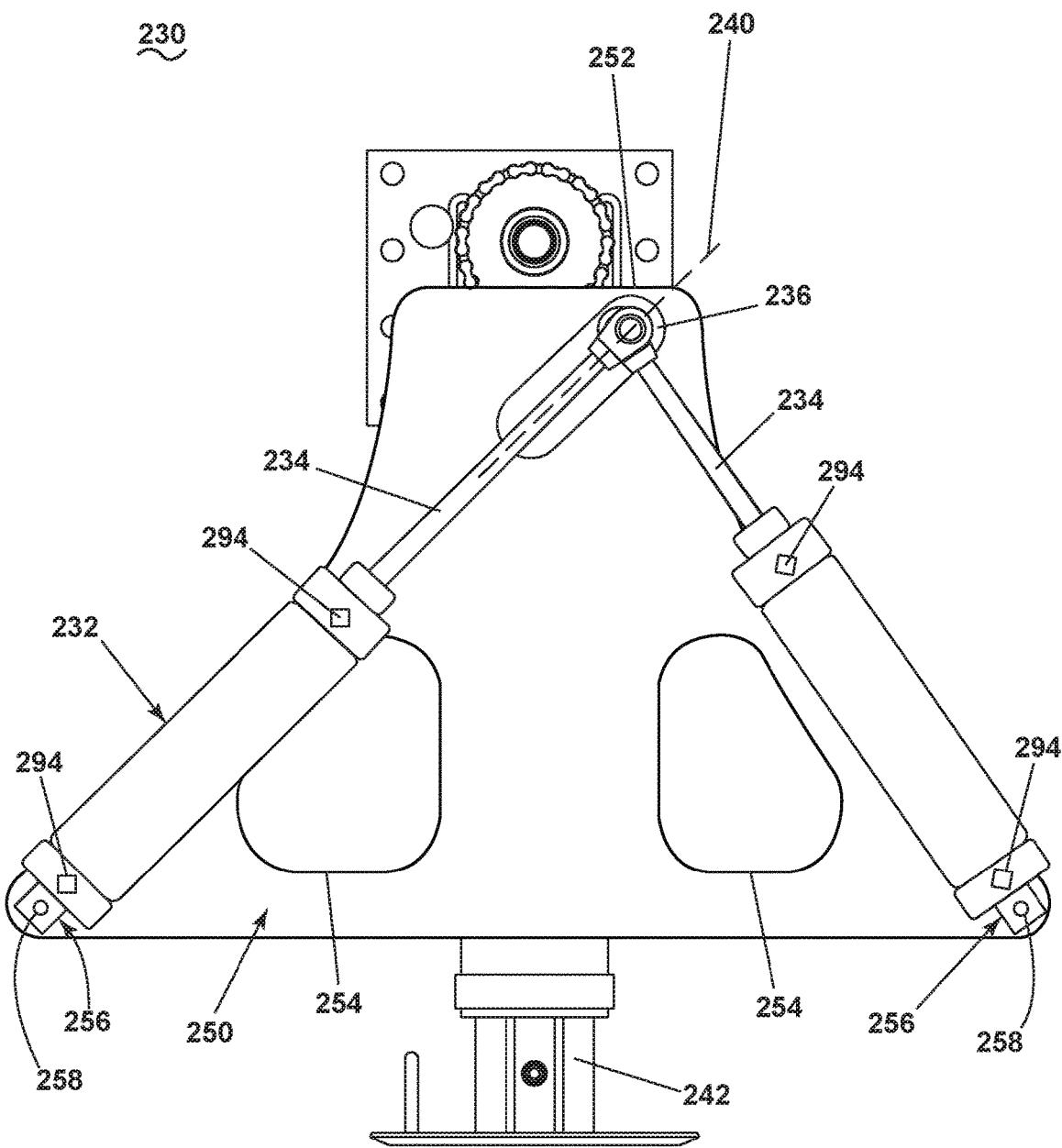
FIG. 14 is a front view of a semi-trailer landing gear having two, dual-acting air drivers.

Referring now to FIG. 14, another semi-trailer landing gear 230 is shown and can be substantially similar to the semi-trailer landing gear 30 of FIGS. 2-8. As such, similar numerals will be used to describe similar elements, increased by a value of two hundred, except for the crank line, indicated as 240, and the discussion will be limited to differences between the two. More specifically, FIG. 14 includes the semi-trailer landing gear 230 with two, dual-action air drivers 232, as opposed to four single-action air drivers 32 of FIG. 2. As such, only two dual-acting air drivers operably coupled to a crank 236 to drive the crank 236. The remainder of the semi-trailer landing gear can be substantially similar to that of the semi-trailer landing gear 30 of FIGS. 2-8. When one shaft 234 of one air actuator 232 is aligned with the crank line 240 of the crank 236, the other shaft 234 of the other air actuator 232 is offset from the crank line 240, such that at least one air driver 232 is always driving rotation of the crank 236.

The dual-action air drivers 232 provide both a pushing force, driving the shaft 234 outwardly, as well as a pulling force, pulling the shaft 234 inwardly. In this way, the dual-action air drivers 232 generate a constant force on the crank 236 unless the shaft 234 is in a toggle condition. A pair of inlets 294 can be provided on each of the air drivers 232, providing for receiving a force, such as air pressure, used to actuate the shaft 234 in either direction.

A mount plate 250 can have a substantially triangular shape, with a truncated top 252. A pair of apertures 254 can be provided in the mount plate 250, while it is contemplated that the mount plate 250 contain no apertures or any number of apertures. The crank 236 mounts at one end of the mount plate 250 near the truncated top 252. The air driver shafts 234 of the air drivers 232 couple to the crank 236, while an opposite end 256 of the air drivers 232 couple to the mount plate 250 at a pivot mount 258. The air drivers 232 can pivot relative to the mount plate 250 at the pivot mounts 258, respective of rotational movement of the crank 236.

Figure 15:
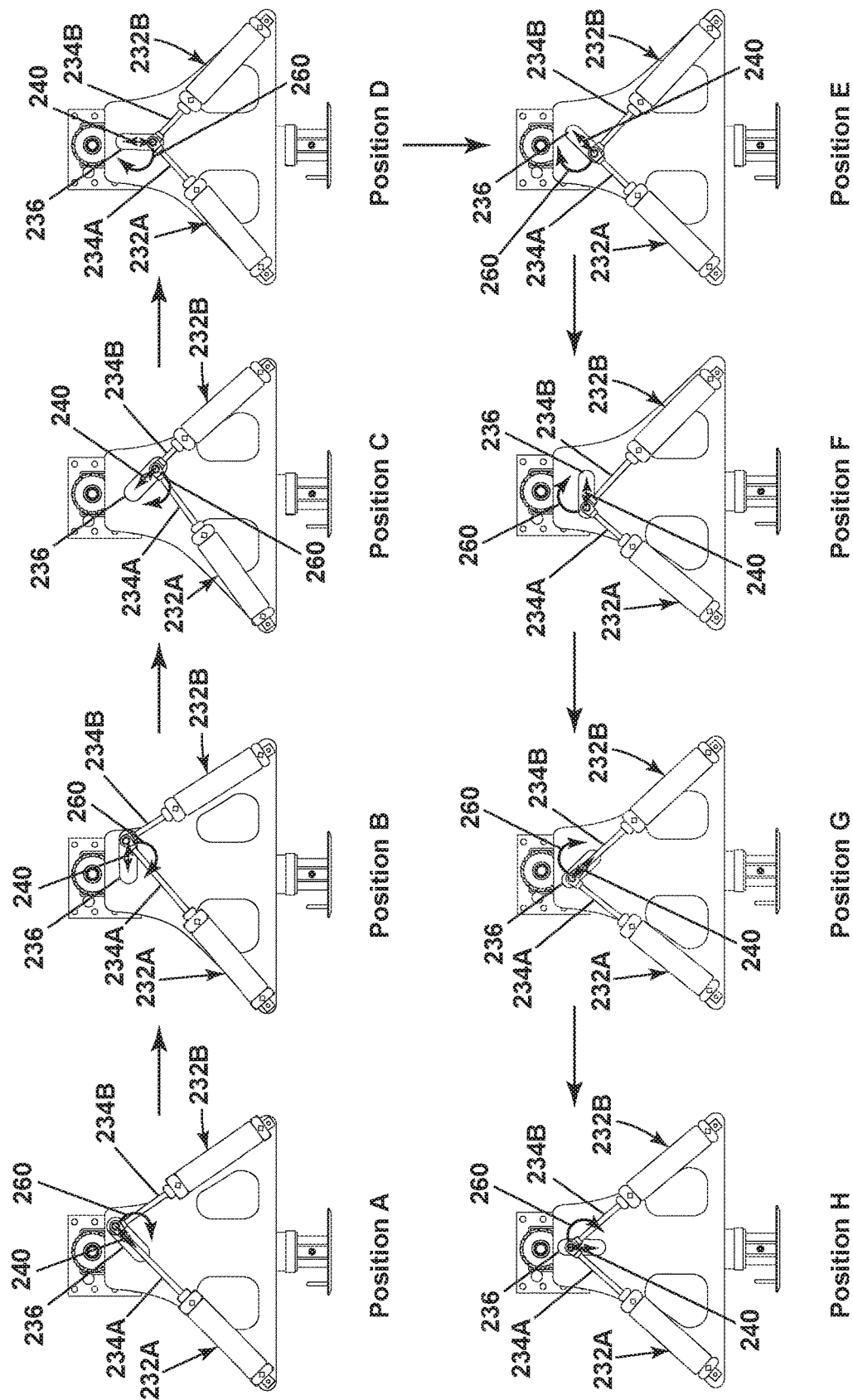
FIG. 15 is a timeline chart illustrating rotation of a crank of the semi-trailer landing great of FIG. 14 as driven by the two, dual-acting air drivers for one revolution.

Referring now to FIG. 15, operation of the set of air drivers 232 can be explained. FIG. 15 depicts a series of operational positions for the set of air drivers 232 and air driver shafts 234 during one driven revolution of the crank 236, with the positions being labelled position A through position H, in sequential order. The crank line 240 is illustrated with an arrow and the directional rotation 260 is also written with an arrow indicating the direction of rotation. It should be appreciated that the air is pressurized in a given air driver 232, and the respective air driver shaft 234 is driven outwardly with a driving force, and when pressure in the given air driver 132 is relieved, the driving force dissipates and the air driver shaft 234 can be urged inwardly, while it is contemplated that each air driver 232 can operate by pulling the air driver shaft 234 inwardly. Additionally, each air driver 232 will be labelled air driver 232A and 232B, and each air driver shaft 234A and 234B for clarity of description. As is appreciable, the crank 236 rotates in the clockwise direction and will be assumed to lower the leg 242, while counter-clockwise rotation is contemplated to raise the leg 242.

At position A, air driver 232A is in a toggle condition, having the shaft 234A aligned with the crank 236 and fully extended, under no pressure and imparting no force to the crank 236. Air driver 232B is at a maximum offset, and is retracting, pulling the crank 236 downward, in the clockwise direction. In this position, air driver 232 is at an acute angle in front of a line perpendicular to a crank line in the direction of rotation, and pulls the crank 236 to impart a torque on the crank 236. At position B, air driver 232A moves beyond the toggle condition of position A and into a position in an acute angle in front of a line perpendicular to a crank line in the direction of rotation, and begins to pull the crank 236 in the clockwise direction, while air driver 232B continues to pull the crank 236 downwardly.

At position C, air driver 232B is in a toggle condition, having the shaft 234B aligned with the crank 236 and fully retracted, under no pressure and imparting no force to the crank 236. Air driver 232A is at a maximum offset, continuing to pull the crank 236 in the clock-wise direction. At position D, air driver 232A continues to pull the crank 236 in the clockwise direction, while air driver 232B moves into a position where the air driver shaft 234B is at an acute angle behind a line perpendicular to a crank line in the direction of rotation, begins to push the crank 236 in the clockwise direction, extending the shaft 234B. As is appreciable, the acute angle in front of or behind the line perpendicular to the crank line determines a pulling or pushing force imparted to the crank 236, respectively.

At position E, air driver 232A is in a toggle condition, fully retracted, under no pressure and imparting no force on the crank 236. Air driver 232B is at a maximum offset, providing a maximum driving force and torque imparted to the crank 236. At position F, air driver 232A begins to drive the crank 236, moving into an acute angle behind a line perpendicular to a crank line in the direction of rotation, driving the shaft 234A outward, while air driver 232B continues to drive the shaft 234B outward to drive the crank 236.

At position G, air driver 232B is in a toggle condition, fully extended, under no pressure, and imparting no force on the crank 236. Air driver 232A is at maximum offset, and continues to drive rotation of the crank 236. At position H, air driver 232B begins to pull the crank 236, with the air driver shaft 234B moving into an acute angle in front of a line perpendicular to a crank line in the direction of rotation, while air driver 232A continues to push and drive the crank 236, imparting a torque to the crank 236. From position H, the semi-trailer landing gear 230 will return to position A. It should be appreciated that reversing operation of the air drivers 232 can reverse the rotational direction of the crank 236, providing for selectively raising or lowering the semi-trailer landing gear 230.

Figure 16:
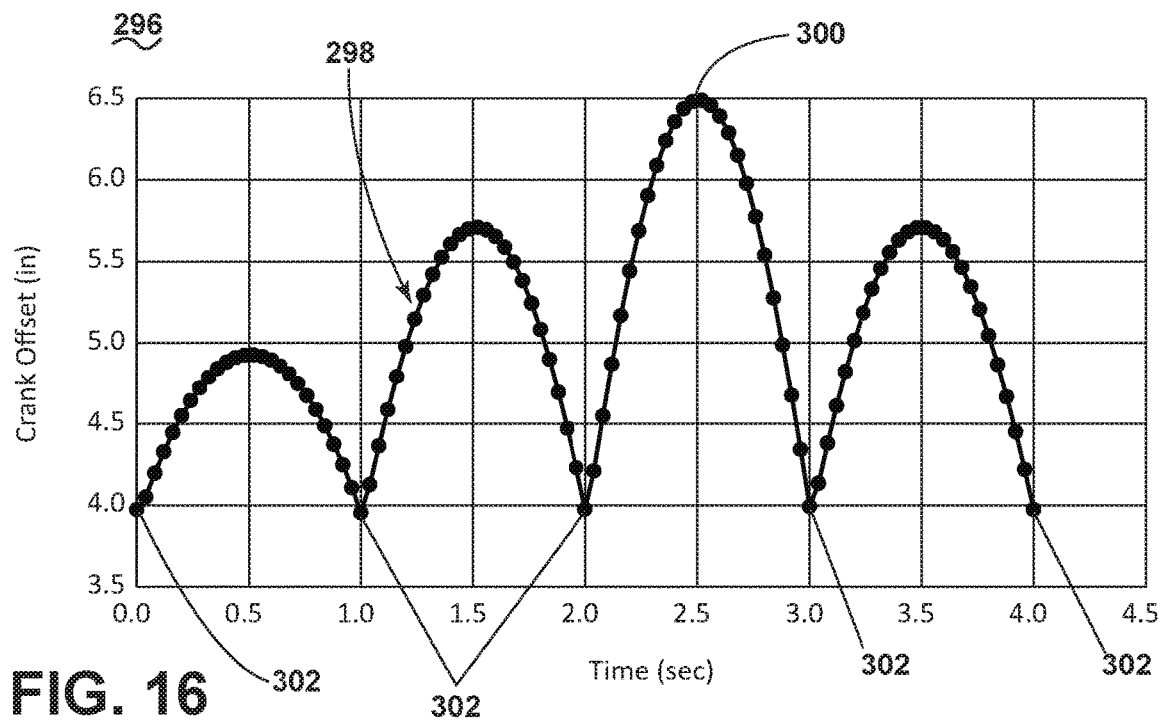
FIG. 16 is a plot showing crank offset over time for the semi-trailer landing gear of FIG. 14.

Referring now to FIG. 16, a first graph 296 includes a plot 298 showing crank offset in inches over time in seconds. The crank offset in inches is representative of the offset from the rotational center or center of action of the crank 236 of FIG. 15. In this way, a greater value for the crank offset represents a greater displacement from the driving direction of motion from the center of action of the crank 236. For example, a maximum crank offset, indicated at 300, has a values of about 6.5 inches (16.51 centimeters) indicates that the sum of the air driver shafts 234 of all air drivers 232 is at a maximum offset from the rotational center of the crank 236. The minimum crank offset, indicated at 302, is about 4 inches (10.16 centimeters), for example.

As the crank 236 is rotatably driven by the air drivers 232, the offset varies between maximum and minimum offset 300, 302, in a substantially periodic manner. In this way, a constant, positive crank offset ensures that a constant driving force or torque is applied to the crank 236. The non-uniform plot 298 can be resultant of an angular offset or positional offset of the mount position of the air drivers 232. A uniform organization of the air drivers 132 can provide for a uniform periodic distribution for plot 298, while a slight offset in position or organization can result in the slight variation in the periodic values for the plot 298. More specifically, a uniform periodic plot can have equal spacing between air drivers 232 by 120-degrees, while a variation from such spacing or even shaft distance can provide for the variation in the plot 152. Additionally, the offset could be resultant of the position of the air driver 232, such as pushing versus pulling the crank 236.

Figure 17:
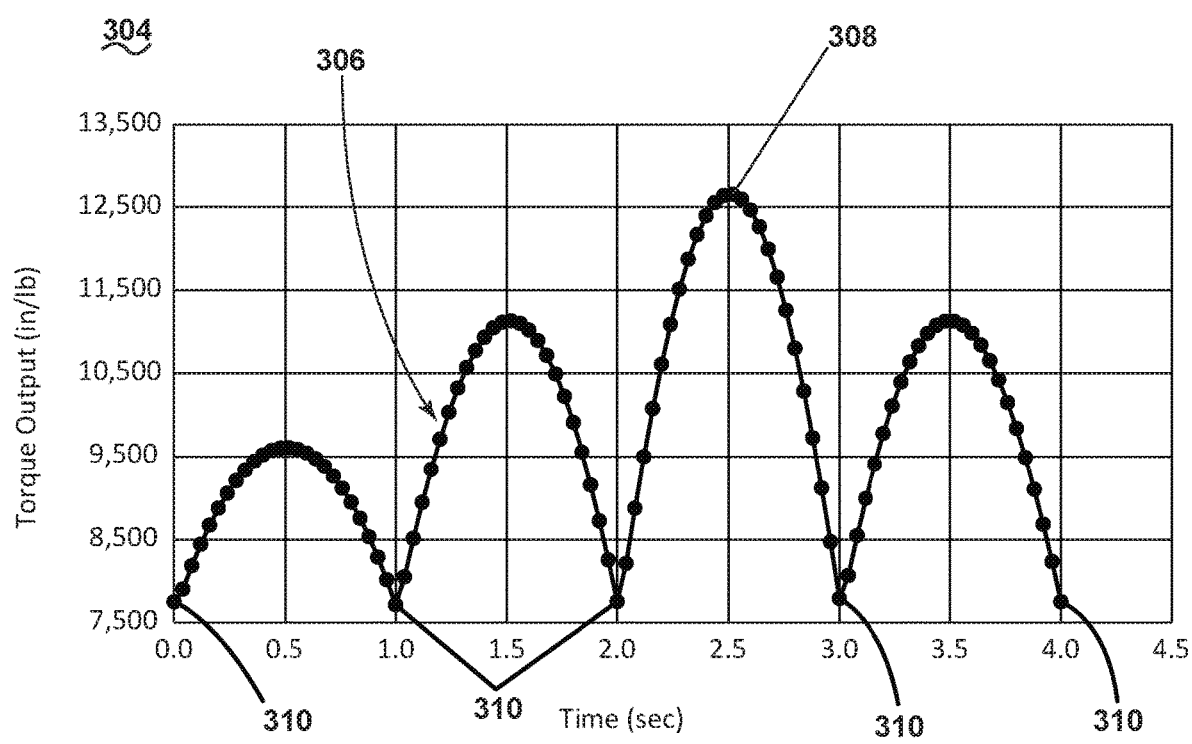
FIG. 17 is another plot showing torque output over time for the semi-trailer landing gear of FIG. 14.

Referring now to FIG. 17, another graph 304 includes a plot 306 showing an output torque in inches per pound (in/lb) over time in seconds, where one in/lb is equal to 0.113 newton meters (Nm) and the time passes as the crank 236 rotates. As is appreciable in comparison to the plot 298 of FIG. 12, the torque output is directly proportional to the crank offset position. A greater crank offset provides for a greater torque, while a lesser crank offset provides for a lesser torque. As should be appreciated, the torque is never zero, as the crank offset is never zero. In this way, rotational driving of the crank 236 is constantly maintained with the set of air drivers 232 varying between offset positions, as illustrated in FIG. 16. While the maximum torque 308 as shown is about 12,700 in/lb (1435 Nm) and the minimum torque 310 is about 7,700 in/lb (870 Nm), it should be understood that the torque can be varied, based upon air driver pressure, air driver shaft length, or positional organization of the air drivers 232, and it should be understood that the torque as shown is exemplary, and can be varied such that the disclosure should not be limited based upon that as shown in FIG. 17.

It should be appreciated that the semi-trailer landing gear 30, 130, 230 as described herein provide for an improved system of raising and lowering a semi-trailer. The set of air drivers provides for a continuous angular offset, which provides for a constant driving torque from the air drivers, which provides for an improved overall torque imparted to the landing gear. This provides for greater and more consistent torque output, as well as automation of raising and lowering the semi-trailer landing gear. Dual air drivers can provide for additional energy savings, as well as cost reduction.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

The invention claimed is:

1. An air driven actuator for raising and lowering a semi-trailer landing gear, the air driven actuator comprising:
   at least two air drivers each including a reciprocating shaft moveable between a fully retracted position and a fully extended position;
   a crank movable about a rotatable axis in a direction of rotation and having a pin spaced from the rotatable axis along a crank line to which the reciprocating shafts of the at least two air drivers are attached; and
   a controller to sequentially pressurize the at least two air drivers urging the reciprocating shafts to apply a force to the crank when the reciprocating shafts move from the fully retracted position to the fully extended position;
   wherein the at least two air drivers are arranged such that at least one of the reciprocating shafts is always at an acute angle behind a line perpendicular to the crank line in the direction of rotation when the one of the at least two air drivers having the at least one of the reciprocating shafts is pressurized by the controller, said actuator further comprising a rotatable shaft operably coupled to the crank and rotatably driven by rotation of the crank by the at least two air drivers, said actuator further comprising a gear assembly operably coupling the crank to the rotatable shaft, wherein the gear assembly includes a first gear coupled to the crank, a second gear coupled to the rotatable shaft, and a chain connecting the first gear to the second gear.

2. The air driven actuator of claim 1 wherein the at least two air drivers includes two dual-action air drivers.

3. The air driven actuator of claim 1 wherein the at least two air drivers includes three air drivers.

4. The air driven actuator of claim 1 wherein the at least two air drivers includes four air drivers.

5. The air driven actuator of claim 1 wherein a gear ratio between the first and second gear is adapted to increase a torque output to the rotatable shaft from the at least two air drivers.

6. The air driven actuator of claim 1 wherein the at least two air drivers provide an overlap in torque provided to the crank such that a total torque acting on the crank is never zero.

7. The air driven actuator of claim 6 wherein the overlap in torque is defined such that while the torque generated by one air driver decreases, the torque generated by the overlapping air driver increases.

8. The air driven actuator of claim 1 further comprising at least two valves complementary to the at least two air drivers.

9. The air driven actuator of claim 8 wherein the at least two valves are operably coupled to the crank and the at least two air drivers wherein the at least two valves control operation of the at least two air drivers based upon a rotational position of the crank.

10. The air driven actuator of claim 9 wherein at least a portion of the crank is asymmetric to actuate the at least two valves based upon a rotational position of the asymmetric portion of the crank.

\* \* \* \* \*